July 8, 1924.  
R. W. BROADHEAD  
1,500,796  
BEARING FOR THE GUIDANCE AND LATERAL SUPPORT OF GAS HOLDERS  
Filed July 11, 1922   2 Sheets-Sheet 1

Inventor:—
Roland Wynn Broadhead
per: A. Gidd
Attorney:—

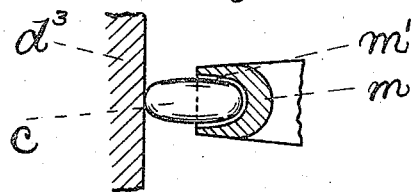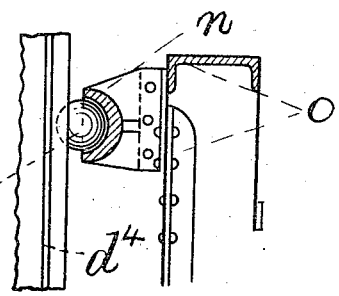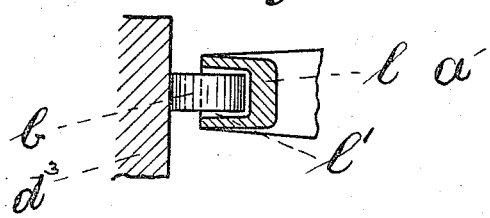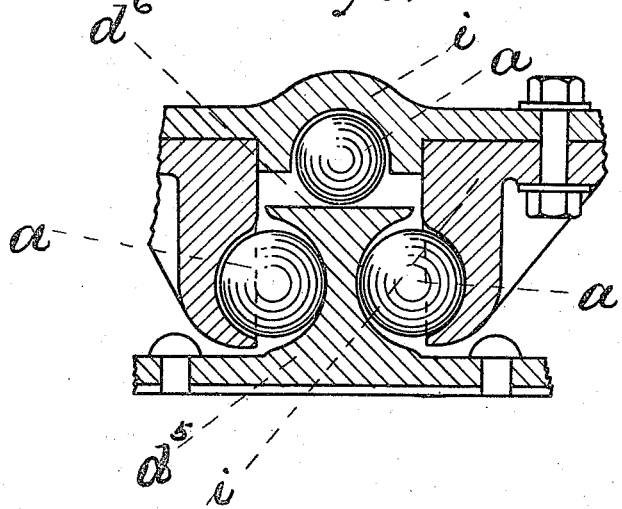

Patented July 8, 1924.

1,500,796

UNITED STATES PATENT OFFICE.

ROLAND WYNN BROADHEAD, OF ELLAND, ENGLAND.

BEARING FOR THE GUIDANCE AND LATERAL SUPPORT OF GAS HOLDERS.

Application filed July 11, 1922. Serial No. 574,331.

*To all whom it may concern:*

Be it known that I, ROLAND WYNN BROADHEAD, a subject of the King of Great Britain, residing at Elland, in the county of York, England, have invented certain new and useful Improvements in Bearings for the Guidance and Lateral Support of Gas Holders, of which the following is a specification.

The invention relates to the lateral support or guidance of gas holders, and has for object to provide improved bearing pieces in substitution for the usual rollers having mechanical axles thereon.

According to my present invention, I provide bearing pieces which are without mechanical axles, and which are so mounted adjacent to the guide rails of spirally guided holders, or adjacent to the standards or vertical rails of other types of holders, as to operate for the purpose intended.

With reference to the accompanying drawings, illustrating forms and applications of my invention, as examples thereof, Fig. 1 is a side sectional elevation of a carriage or support provided with axleless bearing pieces, said carriage assumed to be mounted on a lift of a gasholder of the spirally guided type, with the axleless bearing pieces capable of making contact with a spiral rail on an adjacent lift, the web only of said rail being shown.

Fig. 5 is a further modification of a part of Fig. 3 as well as a different application to the rail or surface it is in contact with.

Fig. 6 shows the form of bearing piece in Fig. 4, in contact with a different kind of surface.

Fig. 7 shows an application of the invention to a standard or vertical rail of other than a spirally guided holder.

Fig. 8 is a sectional plan view, after the manner of Fig. 3, showing the employment of an increased number of axleless bearing pieces in group form.

In Figs. 2, 3, 4, 5, 6, and 8 it is obvious that the guide rails or parts in contact with the bearing pieces involved could be vertical standards or vertical rails of other than spirally guided gas holders.

Figure 2:
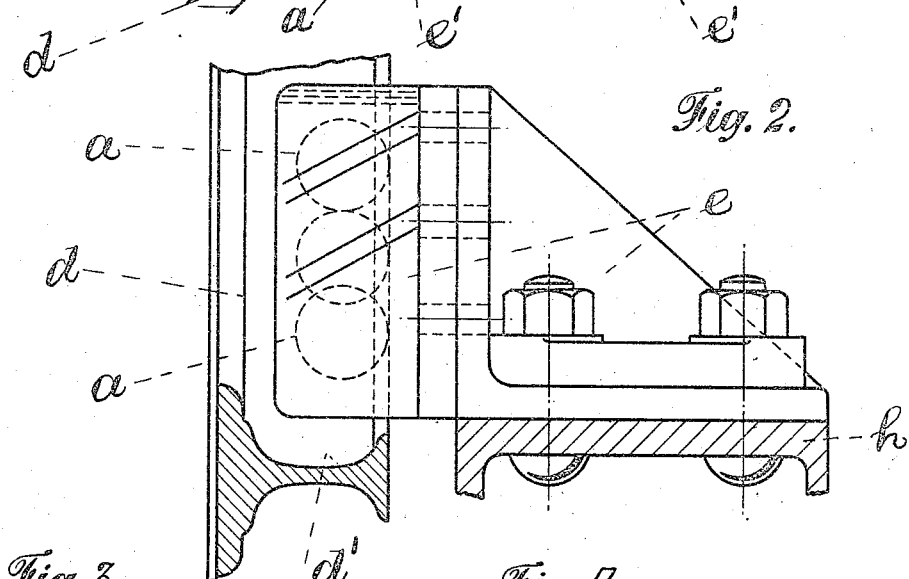
Fig. 2 is a sectional view at right angles with Fig. 1.
Figure 3:
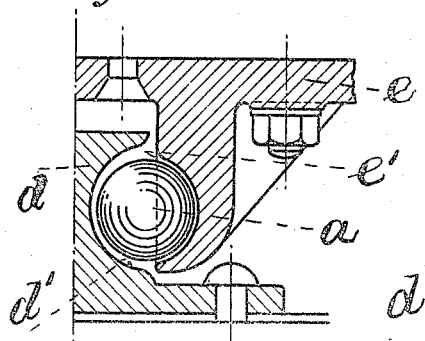
Fig. 3 is a half-sectional plan view of Fig. 2 in part only, and turned so as to make the guide rail at 90 degrees with its position in Fig. 2.
Figure 4:
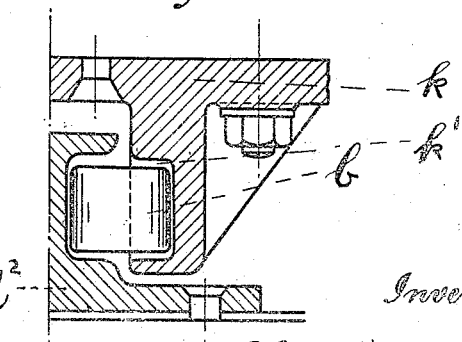
Fig. 4 is a modification of Fig. 3.

In Figs. 1, 2, 3, 7, and 8, the axleless bearings or pieces, according to my invention, consists of spheres such as steel balls $a$, while in Figs. 4 and 6, cylindrical pieces $b$, without mechanical axles, are shown.

In Fig. 5 an axleless bearing piece is indicated in a prolate spheroidal form at $c$.

Figure 1:
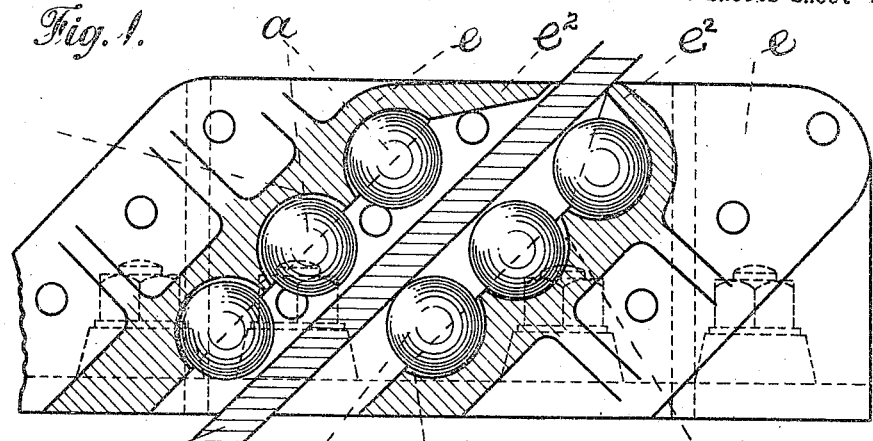

In Figs. 1 to 3 inclusive, $d$ is a guide rail, the sides of the web for which being of considerable concave shape at $d^1$, which groovelike cavity is assumed to extend down the length of the rail aforesaid.

$e$ is a carriage or carrier provided with pocketlike cavities at $e^1$, a steel or like ball $a$ being contained or received by each of said cavities. These cavities are stated to be pocket-like because each has but one opening to the exterior through which the ball or bearing piece projects, there being no side or end openings needed for axles according to ordinary practice. The carriage $e$ is shown attached to a lift $h$ of the holder, but it is obvious that said carriage could be attached to the tank side. In Fig. 1 is a group of bearing pieces $a$ or three on each side of the web of the rail, although the number of said pieces employed in a group is a matter of preference or suitability.

In Fig. 8 balls or bearing pieces $a$ are arranged so that in or about one plane a pair of same engaged within the concave parts of the rail $d^5$ operate similarly to the case of Fig. 3, but a third ball $a$ is mounted in a carriage or carrier $i$ so as to be capable of bearing against the outer surface of the head $d^6$ of said rail.

In Figs. 4 and 6, the cylindrical bearing piece $b$ is mounted in a pocket-like cavity in the carrier employed. This cavity is indicated at $k^1$ in carrier $k$ in the case of Fig. 4, and at $l^1$ in carrier portion $l$ in the case of Fig. 6. In Figs. 5 and 6, the bearing pieces shown are capable of making contact with flat surfaces in the rails $d^3$, portions only of the latter being shown.

The piece $c$ in Fig. 5 has a suitably shaped cavity $m^1$ in carrier portion $m$.

In Fig. 7, a pocket-like cavity is formed in the carrier $n$ for receiving a ball bearing piece $a$, which carrier is shown attached to a lift portion $o$.

In all cases the bearing pieces without mechanical axles, are capable of movement of rotation, and in the cases of the ball pieces, the axis of rotation is variable according to the manner in which pressure upon the balls is applied, as the holder or lifts rise and fall, and the manner in which the holder is deformed under wind pressure.

It is immaterial as regards the operation of the axleless bearings whether the carriage or carrier such as $e$ is formed in one piece, or of divisible parts, provided means are provided for the insertion of the balls or the like. In the case illustrated at Fig. 1, the inclusion of projecting portions $e^2$ from $e$ would make it convenient for the carrier $e$ to be divisible, such as along a line at or near to the central axis of the web of the rail $d$.

In Fig. 8, the ball $a$ adjacent to the head $d^6$ of the rail $d^5$ will also operate to restrict the amount of approach of the sheeting of the lift to which rail $d^5$ is attached, towards the sheeting of the lift to which carrier $i$ is attached. This tendency or deformation of the holder sheeting occurs to a more or less extent, according to the size of the holder, when said holder is subjected to considerable wind pressure. A certain amount of this movement or deformation is rendered possible by reason of the freedom of the ball referred to in the cavity containing it, and also by reason of the fact of the concave grooving in the rail $d^5$ being here of greater radius or curvature than the balls $a$ capable of contact therewith.

In Fig. 4, $d^2$ is a portion of a guide rail, of slightly different section to that in Fig. 3. In Fig. 7, $d^4$ is a portion of a vertical standard or guide of an ordinary vertically guided gasholder.

The pocket-like cavities to receive the bearings being approximately the same form internally as the parts of the bearing piece contained in each, the only movement said piece is capable of is a spinning movement about a centre within it, movement of translation being impossible.

I claim:—

For guiding and laterally supporting a gasholder, and adjacent the guide rails therefor, revoluble bearing pieces without mechanical axles, and carriages mounted about said holder, having pocket-like cavities, each of approximately the same shape internally as the piece contained therein, with one opening only in said cavity, said cavity freely supporting a bearing piece aforesaid, for allowing the latter to spin within the same without being capable of movement of translation, substantially as herein set forth.

In testimony whereof I have affixed my signature.

ROLAND WYNN BROADHEAD.